(12) United States Patent
Monkress

(10) Patent No.: US 9,869,418 B1
(45) Date of Patent: Jan. 16, 2018

(54) PUNCH TOOL

(71) Applicant: Gregory J. T. Monkress, Collinsville, OK (US)

(72) Inventor: Gregory J. T. Monkress, Collinsville, OK (US)

(*) Notice: Subject to any disclaimer, the term of this patent is extended or adjusted under 35 U.S.C. 154(b) by 0 days.

(21) Appl. No.: 14/713,781

(22) Filed: May 15, 2015

Related U.S. Application Data

(60) Provisional application No. 61/994,501, filed on May 16, 2014.

(51) Int. Cl.
*F16L 41/04* (2006.01)

(52) U.S. Cl.
CPC ....... *F16L 41/045* (2013.01); *Y10T 137/0463* (2015.04); *Y10T 137/6123* (2015.04)

(58) Field of Classification Search
CPC .............. F16L 41/045; Y10T 137/0458; Y10T 137/0463; Y10T 137/6123
USPC .................................................. 137/317, 318
See application file for complete search history.

(56) References Cited

U.S. PATENT DOCUMENTS

| | | | | |
|---|---|---|---|---|
| 2,679,261 A * | 5/1954 | Otis | ...................... | G05D 16/10 137/458 |
| 3,296,861 A * | 1/1967 | Mueller et al. | ....... | G01F 15/185 137/15.03 |
| 3,460,721 A * | 8/1969 | Hamel et al. | ........... | F16K 1/303 137/318 |
| 4,184,504 A * | 1/1980 | Carmichael et al. | . | E21B 33/068 137/15.13 |
| 4,283,954 A * | 8/1981 | Echtler et al. | ...... | G01L 19/0681 73/706 |

* cited by examiner

*Primary Examiner* — Kevin Lee
(74) *Attorney, Agent, or Firm* — Gable Gotwals

(57) ABSTRACT

An improved punch tool and a method for relocating a section of pipeline using the improved tool are presented. The improvement includes an interior channel running through the center of the shaft of the punch tool and a connector that is attached to one end of the shaft and to a pressure gauge and pressure bleed valve, thereby allowing the operator to use the same tool to cut, gauge, and purge the section of pipeline to be abandoned.

4 Claims, 5 Drawing Sheets

PUNCH TOOL

CROSS-REFERENCE TO CO-PENDING APPLICATION

This application claims the benefit of U.S. Provisional Patent Application No. 61/994,501 entitled Punch Tool filed May 16, 2014.

BACKGROUND OF THE INVENTION

This invention relates to apparatuses and systems used to drill holes in plastic pipelines that transport natural gas. More particularly, the invention allows an operator to use the same tool to tap and pressure test the pipeline and to gauge and purge the pressure within the pipeline.

In the conventional process, a replacement pipeline is attached to the section of the original pipeline that is to be abandoned. The operator then uses a high volume "T" punch tool to tap the original pipeline at a point where the original and replacement pipelines intersect. Next, the replacement pipeline is purged through a hole located near the opposite end of the replacement pipeline. The punch tool is then used to tap the original pipeline at the other point where the original and replacement pipelines intersect. Two pressure gauges are installed on the original pipeline, one near each point where the pipeline has been tapped and on the opposite side of the section of original pipeline that is to be abandoned. The operator then squeezes off the section of pipeline between the two taps that is to be abandoned, gauges it to make sure that there is no pressure loss, and purges it. The next step is to cut that section of pipeline, with the cuts located near the squeeze-offs and on the opposite side of the taps. The open ends of the pipeline are then capped to complete the relocation. This process requires about thirteen steps. The process also requires separate tools for tapping, gauging, and purging the pipeline and that the original and replacement pipelines be tapped, purged, or gauged at six different locations.

There is a need for a single tool that can be used to tap the pipeline and to gauge and purge the pressure within the pipeline. This allows the operator to relocate a section of pipeline using fewer steps and less equipment and parts, thereby reducing the time required for each relocation as well as the associated costs. In addition, the total number of tools an operator must carry is reduced, further improving efficiency and reducing the cost of operations, maintenance, and repair.

SUMMARY OF THE INVENTION

An improvement to a punch tool for tapping a pipeline is presented. The improvement includes a channel running through the center of the shaft of the punch tool, a connector that is attached to the shaft, and a pressure bleed valve and pressure gauge that are attached to the connector.

A method for relocating a section of pipeline using the improved punch tool is also presented. The steps of the method include attaching a replacement pipeline to the section of original pipeline that is to be abandoned, installing a first improved punch tool at a first location where the replacement and original pipelines intersect, installing a second improved punch tool at the other location where the replacement and original pipelines intersect, tapping the original pipeline with the first improved punch tool, purging the pipeline through a pressure bleed valve on the second improved punch tool, tapping the original pipeline with the second improved punch tool, and using the pressure gauges on the first and second improved punch tools to determine pressure within the section of abandoned pipeline.

DETAILED DESCRIPTION OF THE PREFERRED EMBODIMENT

The invention refers to an improvement to a punch tool so that the same tool can be used to tap the pipeline at the desired location, gauge the pressure within the pipeline, and purge the pipeline. The invention also refers to a method of using the improved tool that allows an operator to relocate a section of pipeline using fewer steps and less equipment and parts.

Figure 1:
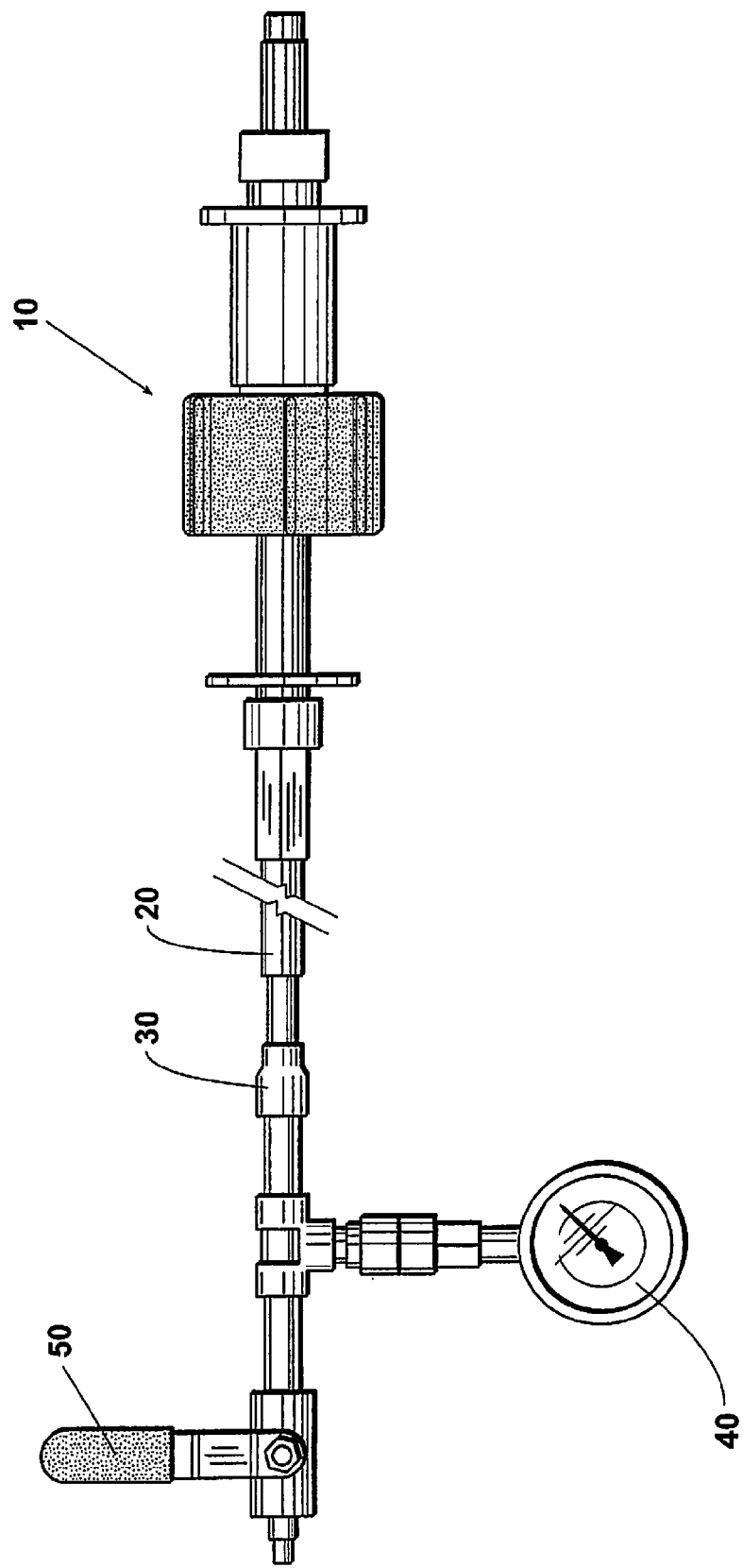
FIG. 1 is a perspective view of an embodiment of the present invention, showing the punch tool having a straight shaft, connector, pressure bleed valve, and pressure gauge.
Figure 2:
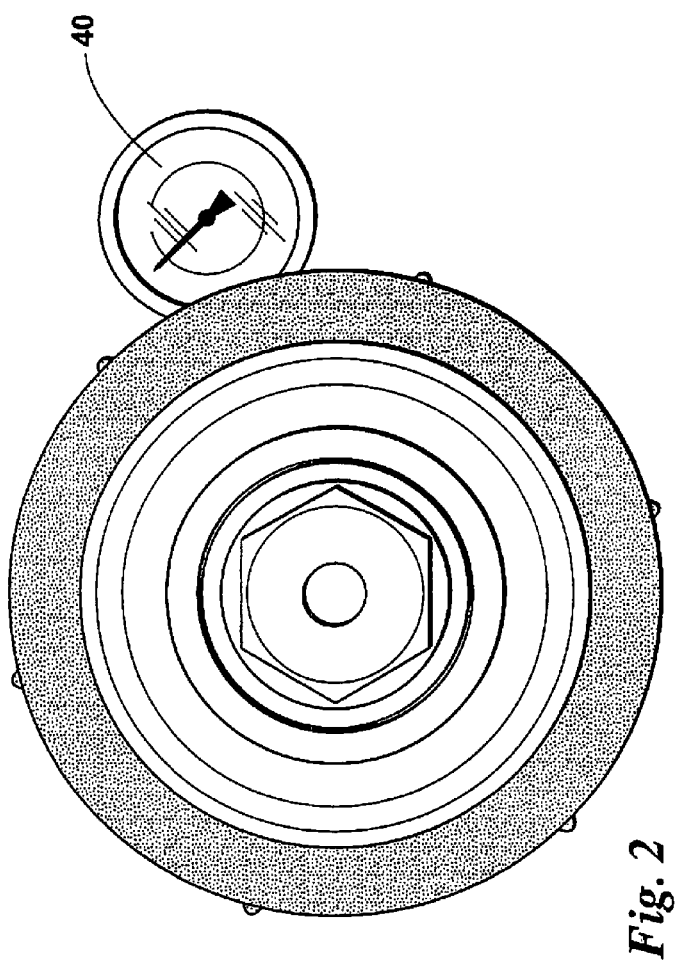
FIG. 2 is a bottom plan view of the embodiment of FIG. 1.
Figure 4:
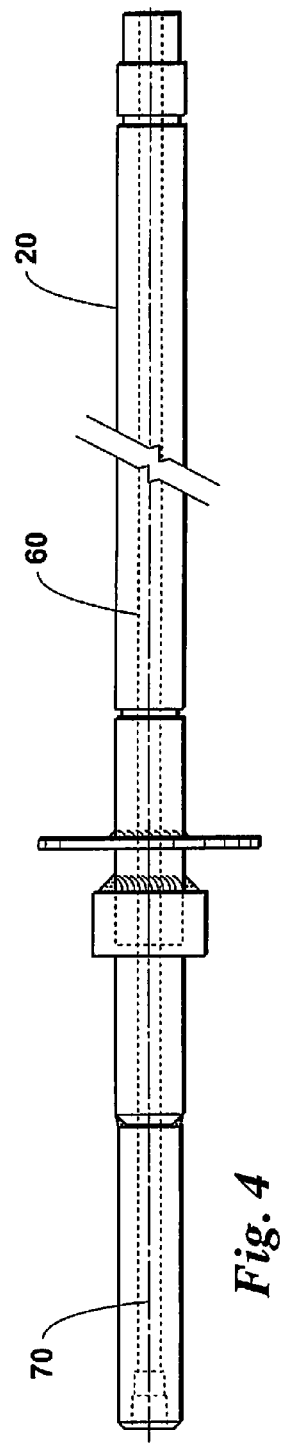
FIG. 4 is a cross-sectional view of the straight shaft of the embodiment of FIG. 1, showing the channel running through the center of the shaft of the punch tool.
Figure 3:
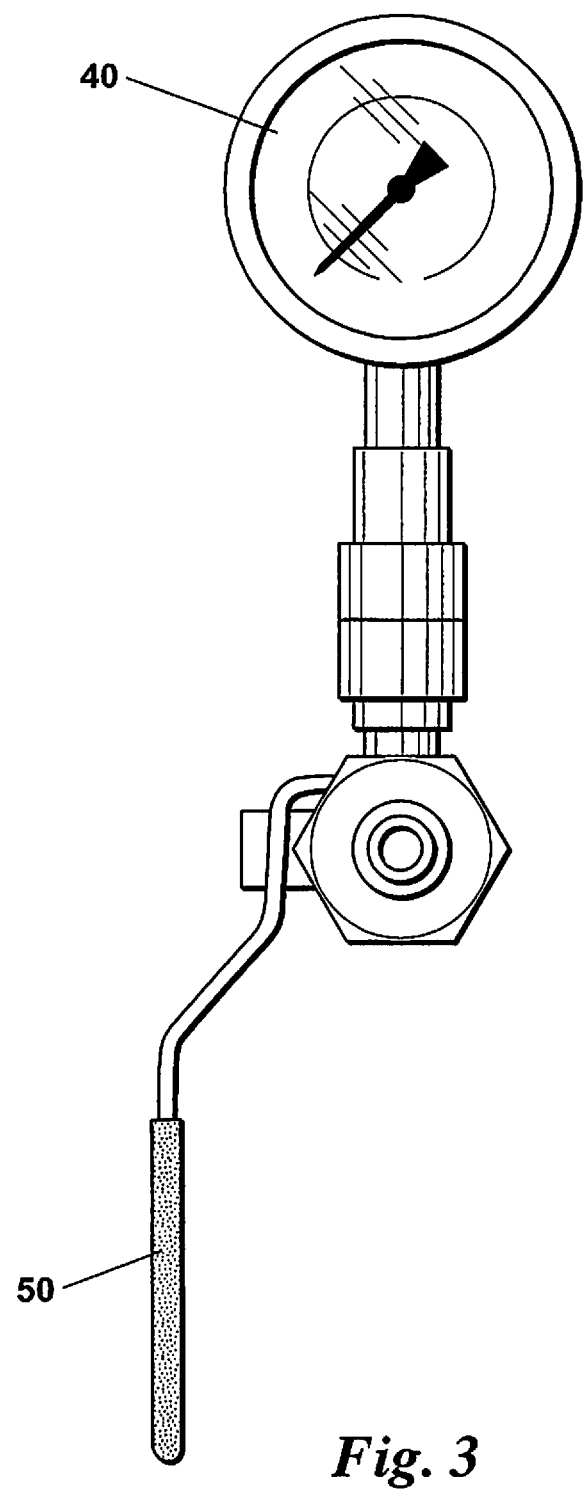
FIG. 3 is a top plan view of the embodiment of FIG. 1.

The apparatus is an improvement to a high volume restricted blow-by punch tool that is used to drill holes in plastic pipelines. As shown in FIGS. 1-3, one embodiment of the tool 10 has a straight shaft 20 and a connector 30 that is attached to the shaft 20 by various means, including but not limited to threading and welding. For example, the connector 30 may be a nipple that is threaded onto the shaft 20. The end of the connector 30 that is not attached to the shaft 20 of the tool 10 is attached to a pressure gauge 40 and a pressure bleed valve 50. The pressure gauge 40 and pressure bleed valve 50 may be of any type that is known in the industry, and may be separate units or combined into one unit. As shown in FIG. 4, the tool 10 has an interior channel 60 that runs the length of the shaft 20 along its longitudinal axis 70. The interior channel 60 allows natural gas from the pipeline to flow through the tool 10, past the pressure gauge 40 where it can be measured, and purged to the atmosphere through the pressure bleed valve 50.

Figure 5:
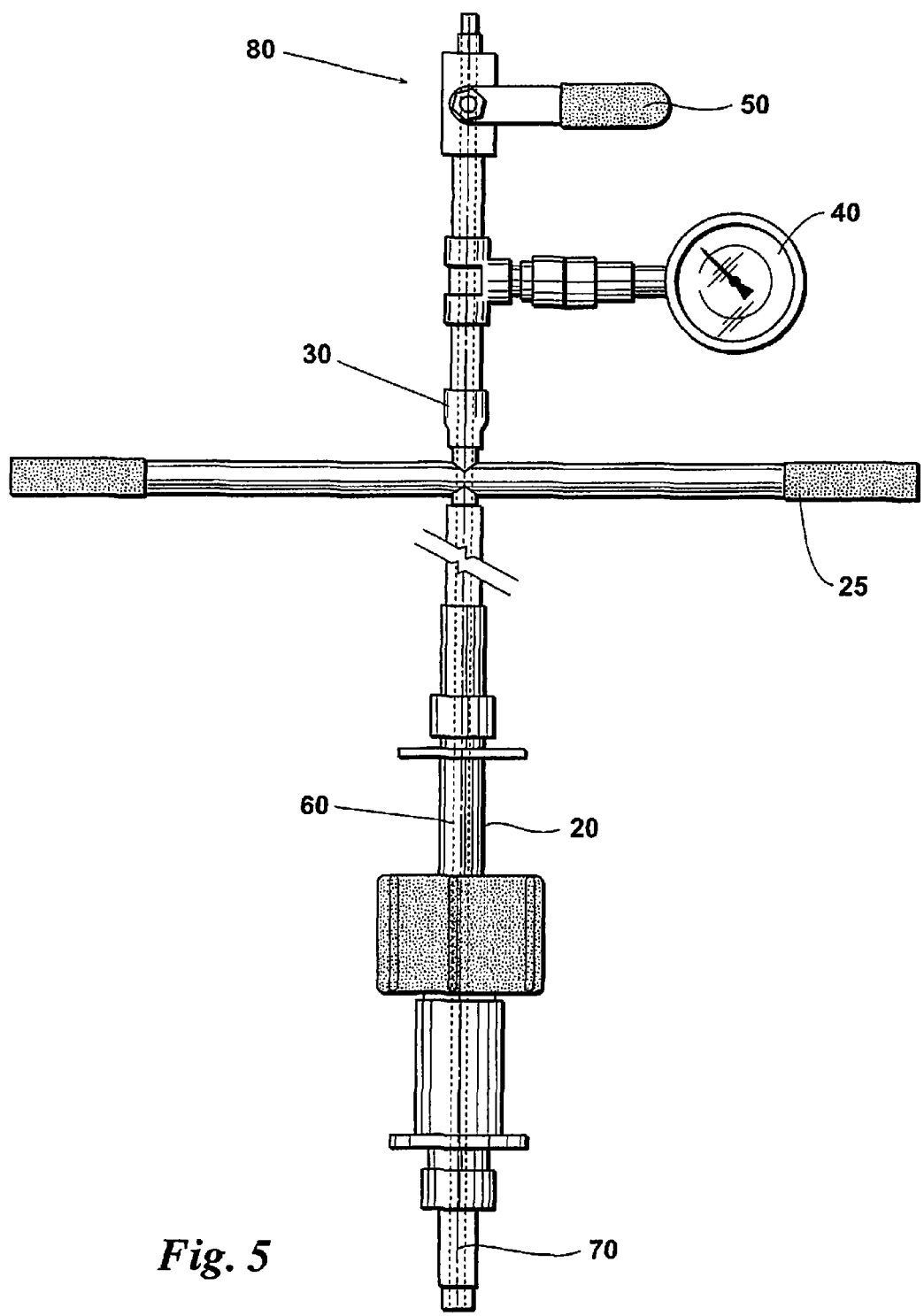
FIG. 5 is an embodiment of the present invention, showing the improved punch tool having a straight shaft with a T-handle, connector, pressure bleed valve, and pressure gauge.
Figure 6:
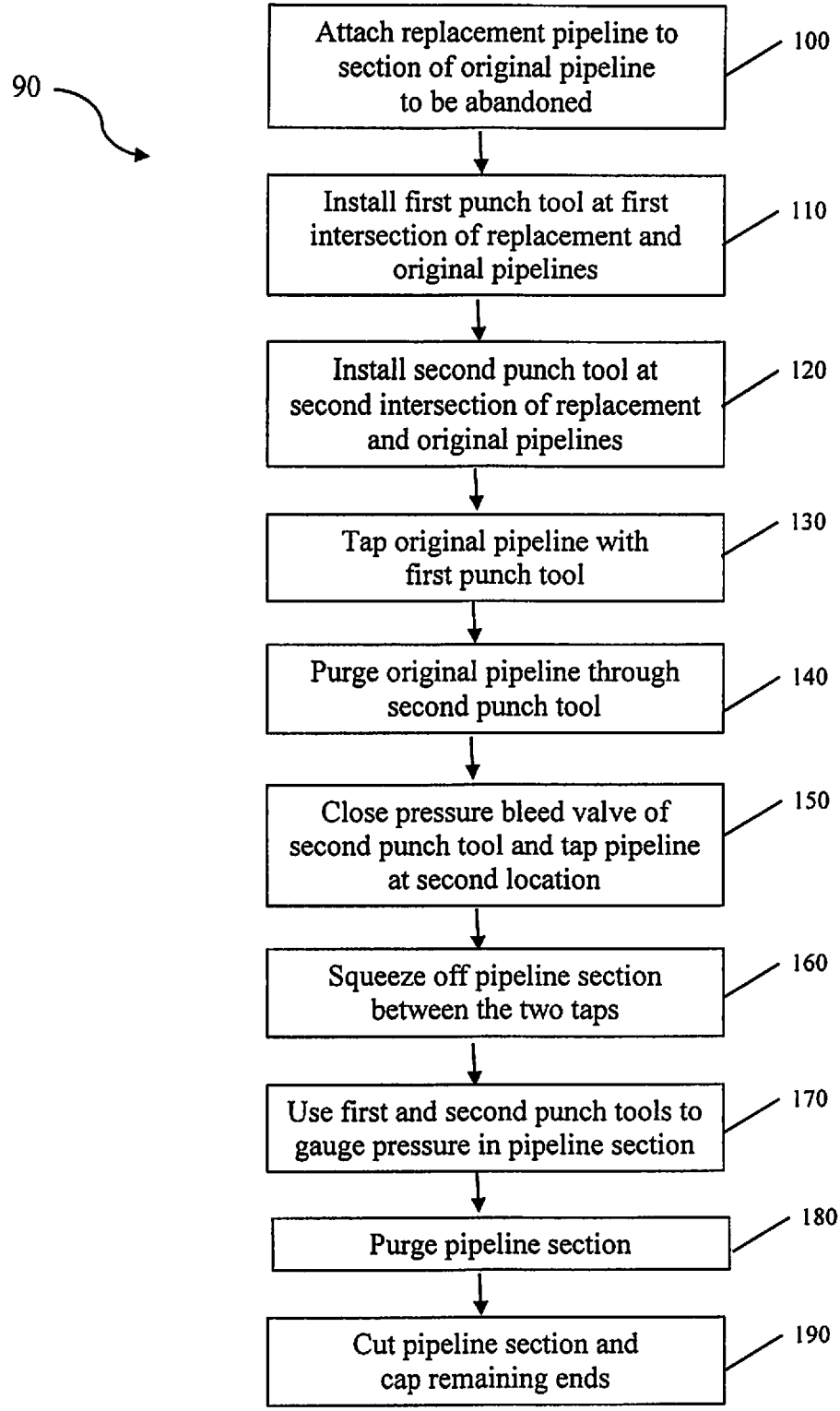
FIG. 6 is a flow chart showing the steps of the method for relocating a section of pipeline using the punch tool.

As shown in FIG. 5, another embodiment of the tool 80 has a straight shaft 20 with a T-handle 25 near one end of the shaft 20. The end of the shaft 20 closer to the T-handle 25 is attached to a connector 30 by various means, including but not limited to threading and welding. The end of the connector 30 that is not connected to the shaft 20 is attached to a pressure gauge 40 and a pressure bleed valve 50. The pressure gauge 40 and pressure bleed valve 50 may be of any type that is known in the industry. The tool 80 has an interior channel 60 that runs the length of the shaft 20, through the T-handle 25, and along the longitudinal axis 70 of the shaft 20. As a result of the interior channel 60, the operator can use the tool 80 both to tap the pipeline and to gauge and purge natural gas from the pipeline into the atmosphere.

In the method of using the improved tool (90), a replacement pipeline is attached to the section of original pipeline that is to be abandoned (100). The operator then installs a first improved punch tool at one of the points where the original and replacement pipelines intersect (110) and a second improved punch tool at the other intersection point (120). Both improved punch tools combine the features of tapping, gauging pressure, and purging. The operator then uses the first improved punch tool to tap the original pipeline (130). The pipeline is then purged through the pressure bleed valve of the second punch tool (140). Once purging is complete, the pressure bleed valve is closed and the pipeline is tapped at the second location (150). The operator then squeezes off the section of pipeline between the two taps that is to be abandoned (160), determines the pressure using the gauges on the first and second improved punch tools (170), and purges it through a small hole in the section of pipeline to be abandoned (180). Finally, that section of pipeline is cut and the remaining ends are capped (190). In comparison to the conventional process, the invention requires fewer steps and the same tool can be used to tap, gauge, and purge the pipeline. In addition, only three locations are required to tap, purge, and gauge the original and replacement pipelines, rather than the six locations that are required for the conventional method.

An apparatus for tapping, purging, and gauging plastic natural gas pipelines and a method for its use have been described. However, the apparatus and method are applicable to pipelines composed of different materials and to different types of pipeline systems. A person of ordinary skill in the art understands that certain changes may be made to the apparatus, the steps of the method, and the order of those steps without departing from the scope of the invention.

What is claimed:

1. A method for relocating a section of pipeline using a punch tool, the method comprising the steps of:
   attaching a replacement pipeline to a section of original pipeline that is to be abandoned;
   installing a first punch tool at a first location where the replacement and original pipelines intersect;
   installing a second punch tool at a second location where the replacement and original pipelines intersect;
   tapping the original pipeline with the first punch tool;
   purging the pipeline through a pressure bleed valve on the second punch tool;
   tapping the original pipeline with the second punch tool; and
   using pressure gauges on the first and second punch tools to determine pressure in the section of original pipeline that is to be abandoned.

2. The method according to claim 1, further comprising the step of squeezing off the section of original pipeline that is to be abandoned after the pipeline has been purged.

3. The method according to claim 1, further comprising the step of purging any remaining natural gas from the section of original pipeline that is to be abandoned after determining the pressure in the section.

4. The method according to claim 1, further comprising the step of cutting the section of original pipeline that is to be abandoned and capping the original pipeline's remaining ends.

\* \* \* \* \*